United States Patent [19]

Laubach et al.

[11] Patent Number: 5,511,795
[45] Date of Patent: Apr. 30, 1996

[54] COMBINED SEGMENTED AND PNEUMATIC SEAL FOR DRUM-TYPE FURNACES

[75] Inventors: Winfried Laubach, Oberhausen; Thomas Gerlach, Neukirchen-Vluyn, both of Germany

[73] Assignee: Man Gutehoffnungshütte Aktiengesellschaft, Oberhausen, Germany

[21] Appl. No.: 191,646

[22] Filed: Feb. 4, 1994

[30] Foreign Application Priority Data

Feb. 5, 1993 [DE] Germany ............... 43 03 298.2

[51] Int. Cl.⁶ ............................................. F16J 15/46
[52] U.S. Cl. ................... 277/34; 277/75; 277/192; 277/201; 432/115
[58] Field of Search ............................. 277/34, 74, 75, 277/76, 81 S, 88, 192, 201, 220; 432/115, 116

[56] References Cited

U.S. PATENT DOCUMENTS

| | | | |
|---|---|---|---|
| 2,153,674 | 4/1939 | Ommundson | 277/34 X |
| 3,967,674 | 7/1976 | Fort | 277/34 X |
| 4,338,080 | 7/1982 | Grandcolas et al. | 432/115 |
| 4,650,340 | 3/1987 | Krawczyk et al. | 277/189 X |
| 4,836,560 | 6/1989 | Haberberger | 432/115 X |
| 5,106,105 | 4/1992 | Drexler | 432/115 X |

FOREIGN PATENT DOCUMENTS

| | | | |
|---|---|---|---|
| 2130717 | 12/1971 | Germany | 277/75 |
| 3644330 | 7/1988 | Germany . | |
| 3744602 | 9/1988 | Germany . | |
| 1691680 | 11/1991 | U.S.S.R. | 432/115 |

*Primary Examiner*—Scott W. Cummings
*Attorney, Agent, or Firm*—McGlew and Tuttle

[57] ABSTRACT

A sealing medium seal for sealing the rotary drum of a drum-shaped furnace against the stationary charging device and the downstream, stationary discharge chamber, in order to prevent infiltrated air from being drawn into the process space and toxic flue gases from surging out. A double seal is provided including wearable individual sections of the sealing ring, which are equipped with a circumferential groove, with a hole, and with a sleeve for the sealing medium connection, and are arranged displaceably between two flanges as well as of a pneumatic, deformable, one-part sealing element, to which pressurized medium is admitted via a connection. The two sealing elements are guided in a chamber formed by two side flanges and a closing flange, as a result of which the sealing elements are completely sealed both in the radial direction and in the axial direction.

17 Claims, 5 Drawing Sheets

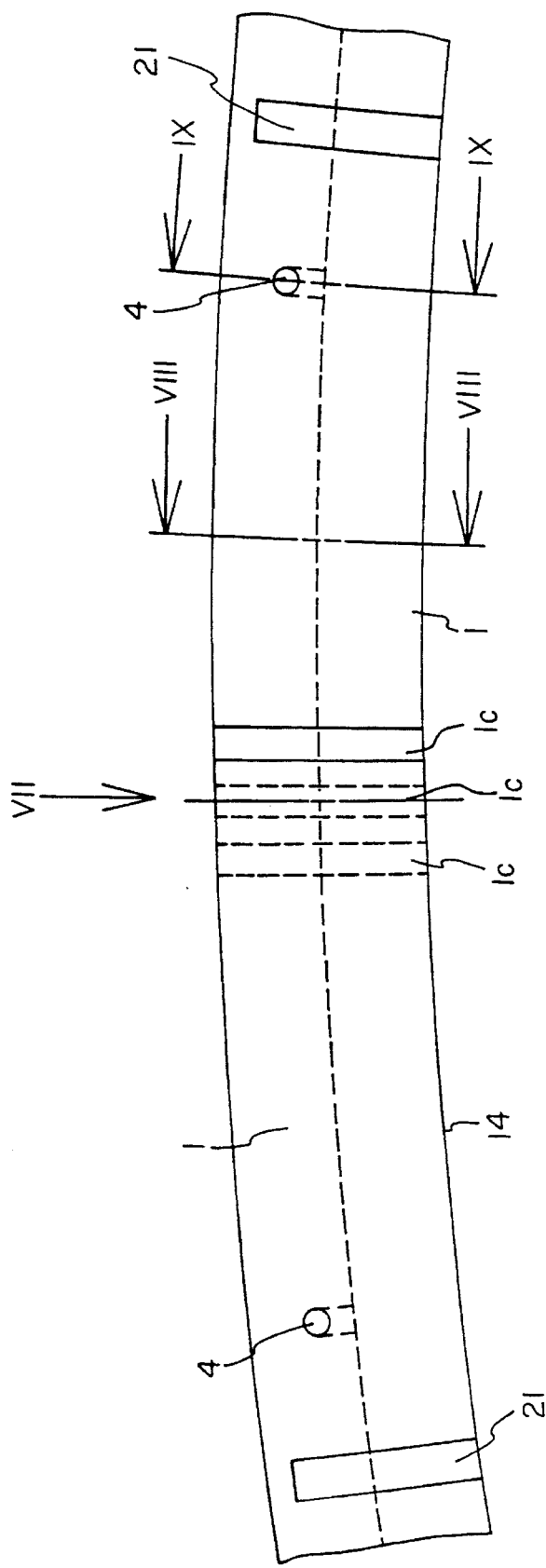
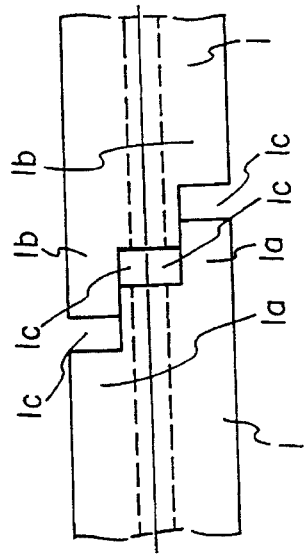
FIG. 7
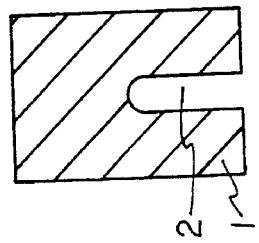
FIG. 8
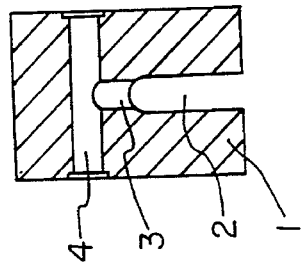
FIG. 9
FIG. 6

COMBINED SEGMENTED AND PNEUMATIC SEAL FOR DRUM-TYPE FURNACES

FIELD OF THE INVENTION

The present invention pertains to a sealing medium seal for sealing rotary drums of a drum-type furnace unit, with a stationary chamber surrounding one end for charging in the charge and with a chamber surrounding the other end for receiving the discharge, the flue gases and residues, with an annular sealing flange arranged on the rotary drum at each end, with a wearable sealing ring, which is attached between flanges, formed of individual sections, and which is seated on the radially extending sealing flange of the rotary drum, wherein feed openings for supplying the sealing medium for the sealing sections are provided.

BACKGROUND OF THE INVENTION

It must be ensured during the treatment of special wastes by incinerating the waste in a drum-type furnace and during the subsequent afterburning of toxic flue gases in the afterburning chamber that the flue gases, contaminated with dioxins and furans, cannot enter the atmosphere through leaks between the individual treatment steps.

Infiltrated air must likewise be prevented from entering the afterburning chamber, from interfering with the combustion process, and from leading, as a result, to an increased consumption of primary energy.

To prevent infiltrated air from entering the drum-type furnace and the afterburning chamber attached thereto, or to prevent combustion gases from being discharged due to explosion the charge or feed side and the inlet side of the afterburning chamber are sealed against the rotary drum.

A seal between a first component formed by the rotary tube of a rotary drum-type and a second, stationary component has been known from DE 36 44 330. The first component has a radially outwardly projecting ring, which is surrounded by a ring housing, which is sealed by a compensator against the second component, and the two side walls of which contain concentrically arranged annular grooves at the inner surfaces. A sealing ring made of an elastic, flexible sealing material, as well as a support ring are axially displaceably arranged in these grooves, and one side of the support ring is in contact with the sealing ring, and the other side of the support ring is supported on coil springs, which press the sealing ring against the groove. The ring housing has guide holes, into which extend bolts, which are rigid parts of the second component and are parallel to the axis of rotation.

A device for sealing drum-type furnaces against stationary housings by means of radial sliding surfaces on a stationary sliding ring and on a radially and axially movable, rotating wear ring has been known from DE 37 44 602. A support ring was modified such that, being the core of the seal, it assumes all functionally important tasks. This ring is axially movable due to a plurality of hinged straps, is pretensioned by a plurality of tension springs, and is additionally connected to the rotating drum via tangential connecting rods. An annular groove, provided in the support ring, is used to accommodate a two-part wear ring. The collar is looped around as a band and is forcibly deformed into a single-wave expansion compensation means. A spring element provided in the valley of the wave guarantees the dimensional stability of the expansion wave pulled in toward the axis of the drum. The space is kept free of solids in the area of the seal by a stripper and an opening in the stationary housing, and sealing is improved.

Bowden cable seals, which consist of a plurality of wearable sealing segments, which are guided radially movably by divided plate flanges and are pressed against the sealing surfaces of the jacket of the drum-type furnace by means of one or more circular and weight-loaded cables, are frequently used on drum-type furnaces for incinerating special wastes. Sealing is ensured by a sliding seal, which consists of an asbestos-free material containing a high percentage of graphite.

The disadvantage of the use of this bowden cable seal is the different pressing force on the sealing segments, which applies unequal sealing pressure on the sealing segments because of the subsiding normal forces when viewed in the circumference. This leads, as a result, to different degrees of wear.

To achieve a sufficient minimum pressing force on all segments, a higher pressing force must be applied to the first segments than the minimum pressing force necessary for the segments located farther away.

Another disadvantage of this seal is the leaks at the overlapped joint areas of the segments, so that flue gases can escape or infiltrated air can be drawn in the radial direction as well as in the axial direction here.

Additional leaks in the axial direction develop as a result of the chambering of the individual sealing segments having gaps, which are formed at the joint areas of the chamber flanges.

SUMMARY AND OBJECTS OF THE INVENTION

It is the primary object of the present invention to provide a seal between the rotary drum and the stationary parts of the drum-type furnace unit, which guarantees complete sealing against the escape of surges of gas in the case of overpressure or against the drawing in of infiltrated air into the reaction spaces in the case of vacuum, and which makes possible uniform wear of the sealing elements over the circumference of the rotary drum.

According to the invention, a sealing medium seal for sealing rotary drums of a drum-type furnace unit is provided. The unit includes a stationary chamber surrounding one end for charging in the charge and a chamber surrounding the other end for receiving the discharge, the flue gases and residues. The unit has an annular sealing flange, which is arranged on the rotary drum at each end. A wearable sealing ring is attached between flanges. The wearable sealing ring includes individual sections and is seated on the radially extending sealing flange of the rotary drum. Feed openings for supplying the sealing medium for the seal sections are provided. Every individual section of the sealing ring is provided with a circumferential groove, with a hole, and with a sleeve, which is closed on one side for the sealing medium connection. Each individual section is arranged radially displaceably between the front flange and the rear flange. A deformable, pneumatic sealing element is provided for a pressurized medium. The deformable pneumatic sealing element is arranged above the sealing ring. A closing flange is arranged above the sealing element.

To prevent the escape of toxic flue gases in the case of overpressure from the combustion space of the rotary drum and the afterburning chamber or the drawing in of infiltrated air in the case of vacuum, the sealing between the rotatable drum of the drum-type furnace and the stationary parts on the special waste charging side and the downstream afterburning chamber for the further treatment of the flue gases and of the nonburned solid components of the charge is performed according to the present invention by a double seal.

By grinding in a sealing ring seated on the sealing surface of the rotary drum and by applying a pressing pressure distributed uniformly over the circumference to the individual sections of this sealing ring by means of a second sealing element, it is achieved that the sealing gap between the rotating parts and the stationary parts of the unit is reduced to the extent that surges of gas cannot escape either in the radial direction or in the axial direction, nor can infiltrated air be drawn in.

The double seal according to the present invention is comprised of wearable individual sections of the sealing ring, which are equipped with a circumferential groove, of a hole, and of a sleeve for the sealing medium connection, and are arranged displaceably between two flanges, as well as of a deformable, pneumatic, one-part sealing element, to which a pressurized medium is admitted. The first sealing ring operates as a sliding sealing ring seal.

Both seals are guided in a chamber formed by two flanges, wherein the lower wearable sealing ring consisting of individual sections lies on the annular sealing surface of the rotary drum, and the upper, one-part, pneumatic sealing element is pressed against both the sealing ring and the two side walls (flanges) of the chamber.

The pneumatic sealing element is also pressed against the wearable sealing ring by a circumferential closing flange arranged above the sealing element, as well as by the pressure of the pressurized medium, so that neither surging of flue gases in the case of overpressure nor the drawing in of infiltrated air into the combustion chamber in the case of vacuum is possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings:

FIG. 6 is a cut-away view, showing two individual sections of the ceiling ring, according to the invention;

FIG. 7 is a top view, showing opposite ends of the individual sections shown in FIG. 6, taken in the direction of View VII of FIG. 6.

FIG. 8 is a cross-sectional view, taken along Line VIII—VIII of FIG. 6; and

FIG. 9 is a cross-sectional view, taken through Line IX—IX of FIG. 6.

DETAILED DESCRIPTION OF THE PREFERRED EMBODIMENT

Figure 1:
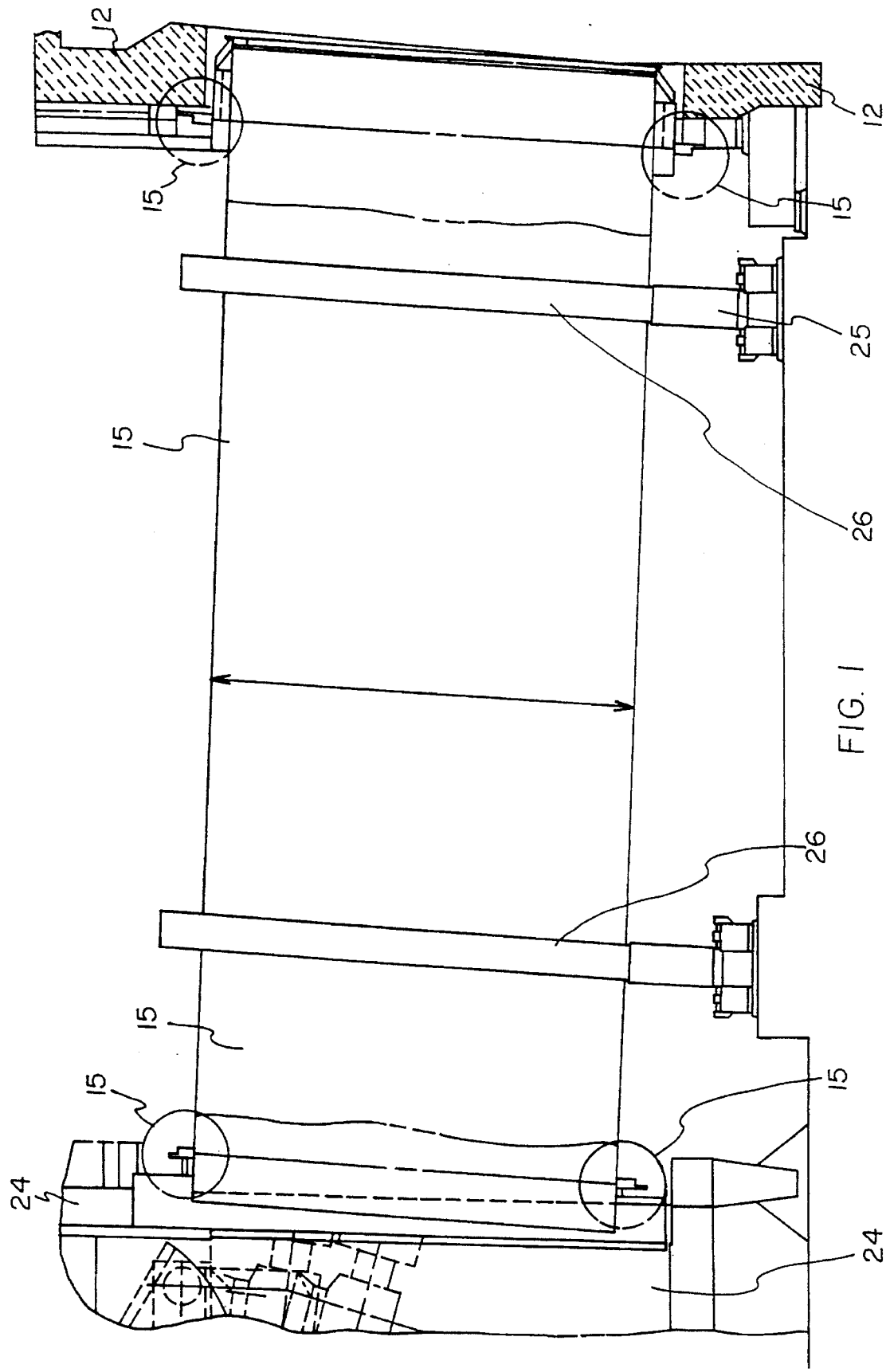
FIG. 1 is a longitudinal sectional view of the rotary drum with the stationary parts.

FIG. 1 shows a detail of an area of the special waste incineration unit with the essential components of the unit, the rotary drum 15, the stationary charging part 24, and the stationary discharge chamber 12.

The rotary drum 15 of the drum-type furnace has a two-sided mounting 25 and rolls on the two ball races 26.

The double seal (two sealing units) according to the present invention, comprised of the sealing ring and the pneumatic sealing element, seals the rotary drum 15 against the stationary charging part 24 and against the stationary discharge chamber 12.

Figure 2:
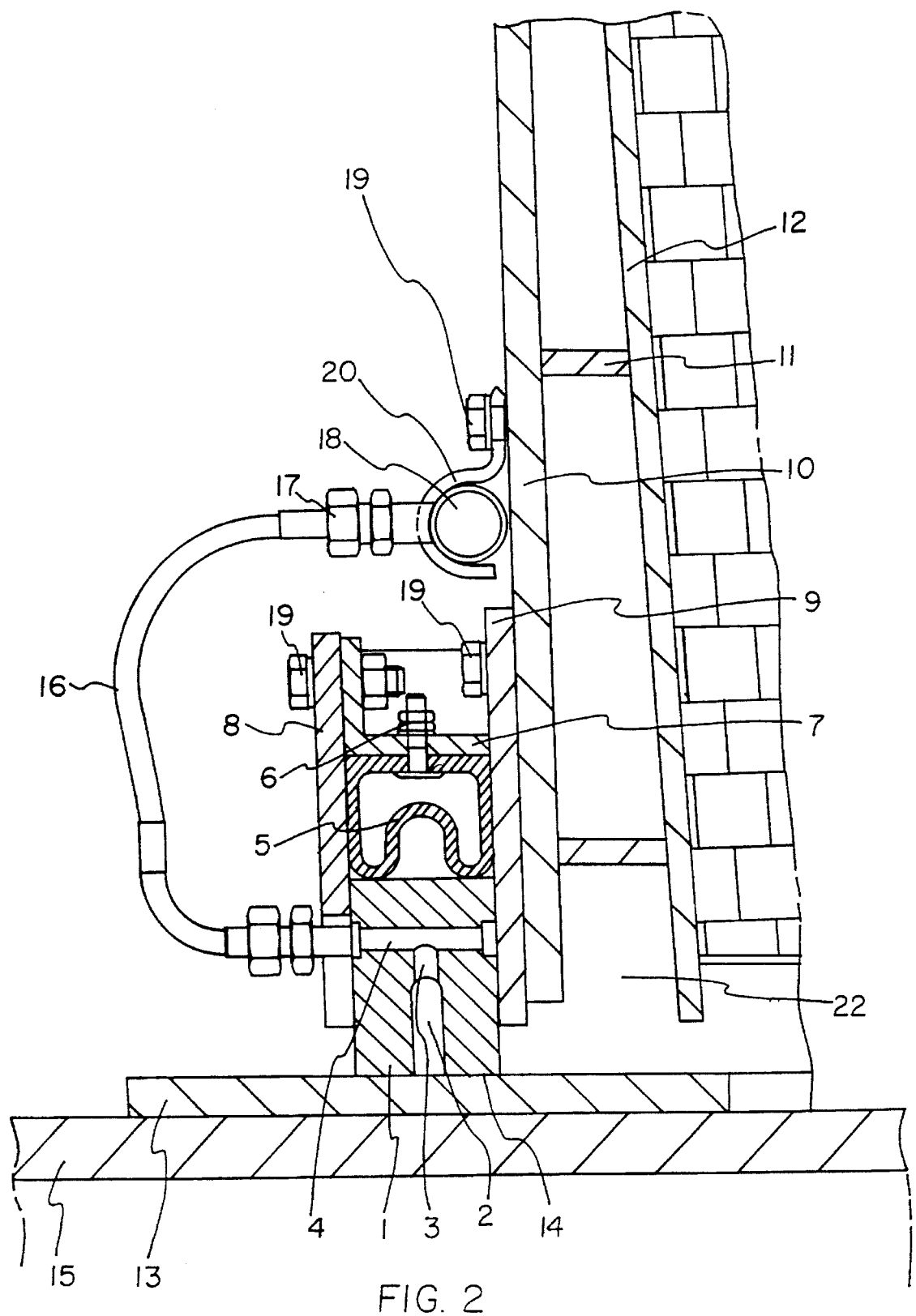
FIG. 2 is a cross sectional view of the double seal with fastening to one of the stationary parts.

FIG. 2 shows the arrangement of the double seal 1, 5 in the area of the afterburning chamber 12.

The wearable sealing ring 1 is comprised of individual sections 1a, 1b and is pressed uniformly onto the sealing flange 13 of the rotary drum 15 by means of a pneumatic sealing element 5. The wearable sealing element 1 is arranged between the two flanges, namely, the front flange 8 and the rear flange 9.

A continuous groove 2 for sealing medium, a hole 3, and a sleeve for the sealing medium connection 4 are worked into the wearable sealing ring 1 consisting of individual sections.

The sealing medium is taken from a closed circular pipeline 18 and is fed to the individual sections 1a, 1b represented in FIG. 6 (Section A) via sealing medium lines 16, 17.

The pneumatic sealing element 5 is attached to the closing flange 7, which is nondetachably arranged on the rear flange 9, via at least one connection part 6. The pressurized medium is also fed in via the connection part 6. The pneumatic sealing element 5 is made in one part for reasons of mounting, and consequently it has two ends.

A mounting flange 10, on which the closed circular pipeline 18 for the sealing medium is arranged by means of fastening elements 19, 20, is arranged on the wall of the discharge chamber 12 via webs 11.

The gas space 22 of the discharge chamber 12 is sealed against the atmosphere via the sealing surface 14 to prevent both flue gases from escaping and infiltrated air from being drawn in here. The gas space 22 is formed between the rotary drum 15 with the sealing flange 13, the individual sections of the sealing ring 1, and the flanges 9, 10.

Figure 3:
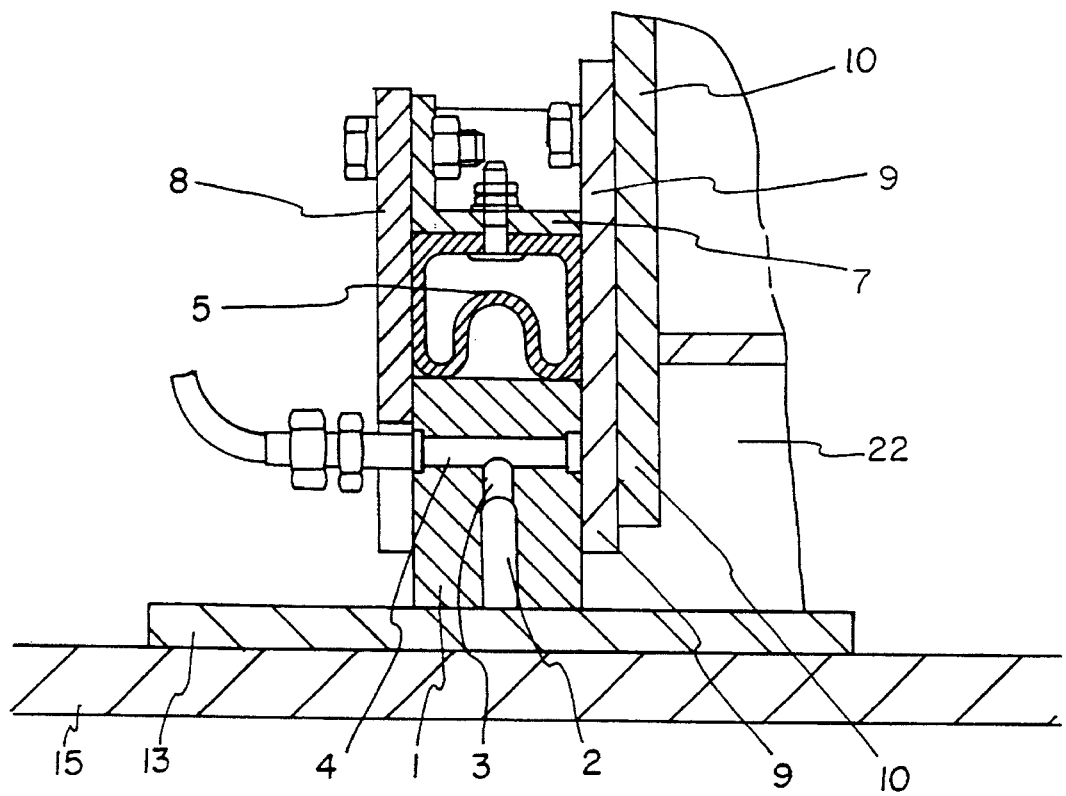
FIG. 3 is a cross sectional view of the double seal with unworn lower sealing ring.
Figure 4:
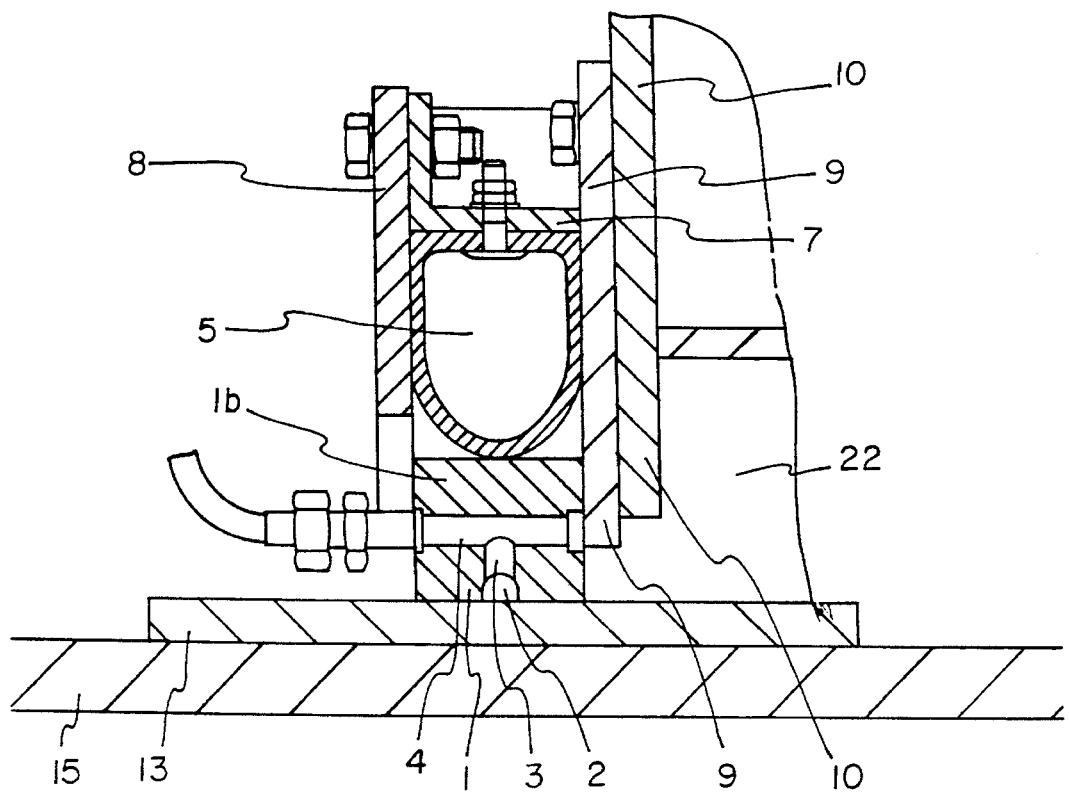
FIG. 4 is a cross sectional view of the double seal with worn lower sealing ring.

FIGS. 3 and 4 show the continuous wear of the individual sections of the sealing ring 1 on the sealing flange 13.

The individual sections of the sealing ring 1 are pressed against the sealing flange 13 by the pressure of the pneumatic sealing element 5 on the individual sections of the sealing ring 1. The two seals 1, 5 are guided between the flanges 8 and 9, which form a chamber together with the closing flange 7, so that neither radial nor axial leaks will develop.

Figure 5:
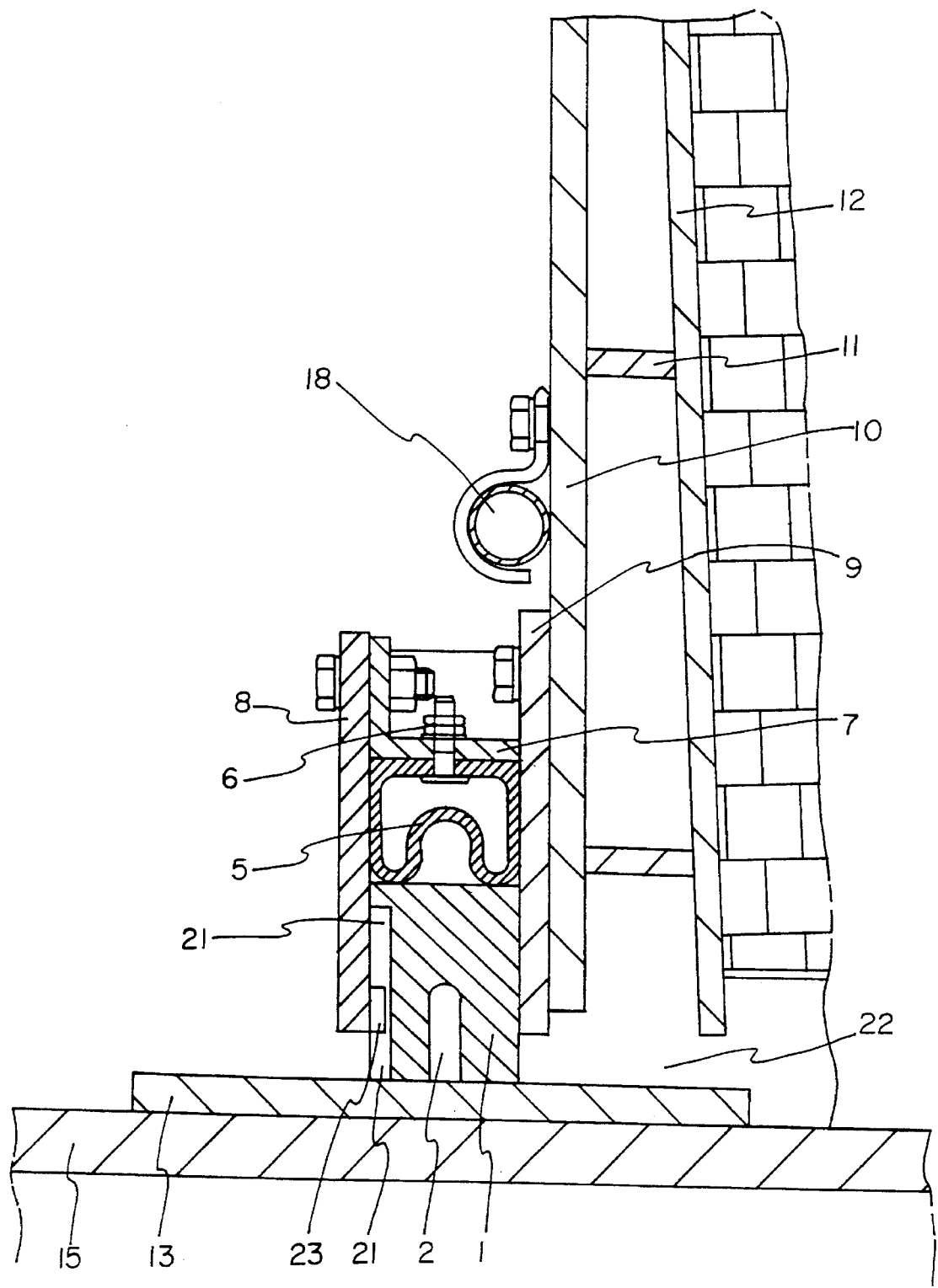
FIG. 5 is a cross sectional view similar to that in FIG. 2.

FIG. 5 shows a cross section through an individual section of the sealing ring 1. A laterally arranged recess 21 extends into a stop 23, which is attached to the flange 8 and acts as a moment support for the individual section of the sealing ring 1.

FIG. 6 shows two individual sections of the sealing ring 1, which are pushed against each other, with the sleeve 4 for the sealing medium connection, the recesses 21, and the gaps 1c, represented by broken lines, between the opposite ends of every individual section of the sealing ring 1.

FIG. 7 shows a top view of the opposite ends of the individual sections 1a, 1b, as well as the gaps 1c, located between them, which move closer to each other in the course of the wear of the individual sections of the sealing ring 1 on the sealing surface 14 of the rotary drum.

FIG. 8 shows a cross section through an individual section of the sealing ring 1 with the groove 2 for the sealing medium; section FIG. 9 shows another cross section in the area of the hole 3 and of the sleeve for the sealing medium connection 4 above the groove 2.

While a specific embodiment of the invention has been shown and described in detail to illustrate the application of the principles of the invention, it will be understood that the invention may be embodied otherwise without departing from such principles.

What is claimed is:

1. A sealing medium seal device for sealing rotary drums of a drum-type furnace unit, the unit including a stationary chamber surrounding one end for charging in a charge and with a chamber surrounding another end for receiving the discharge, the flue gases and residues and the unit having an annular axially extending sealing flange which is arranged on each end of a rotary drum, the sealing medium seal device comprising:

a wearable sealing ring seated on said annular sealing flange of said rotary drum, said wearable sealing ring being formed of individual sections, each individual section of said sealing ring being provided with a circumferential groove, with hole connected to said circumferential groove, and a sleeve connected to said hole, said sleeve being closed on one side and having a sealing medium connection on another side;

a sealing element front flange and a sealing element rear flange, said sealing ring being arranged displaceably between said sealing element front flange and said sealing element rear flange;

a deformable, pneumatic sealing element with a pressurized medium, said pneumatic sealing element being arranged above said sealing ring between said front flange and said rear flange; and a closing flange arranged between said sealing element front flange and said sealing element rear flange above said pneumatic sealing element.

2. A device according to claim 1, further comprising:

a sealing medium line connected to said sealing medium connection for each individual section of said sealing ring, said sealing medium line being connected to a circular pipe for resupply of a sealing medium.

3. A device according to claim 2, wherein:

ends of said individual sections of said sealing ring are designed with a stepped pattern in an axial direction of said sealing ring providing gaps between ends of said individual sections.

4. A device according to claim 3, wherein:

said sealing element flange includes a vertically arranged elongated hole for said sealing medium connection introducing said sealing medium line for a sleeve of an individual section of said sealing ring.

5. A device according to claim 1, wherein:

ends of said individual sections of said sealing ring are designed with a stepped pattern in an axial direction of said sealing ring providing gaps between ends of said individual sections.

6. A device according to claim 1, further comprising:

a mounting flange connected to a wall of said stationary chamber, said mounting flange is detachably connected to said rear flange.

7. A device according to claim 6, wherein: said closing flange is nondetachably connected to said rear flange and said rear flange is detachably connected to said mounting flange.

8. A device according to claim 1, wherein:

said sealing element front flange includes a vertically arranged elongated hole for said sealing medium connection introducing said sealing medium line for a sleeve of an individual section of said sealing ring.

9. A sealing medium seal device for sealing rotary drums of a drum-type furnace unit, the unit including a stationary chamber surrounding one end of the drum for charging in a charge and a chamber surrounding another end of the drum for receiving the discharge, the flue gases and residues, the sealing medium seal device comprising an annular axially extending sealing flange extending about each end of the rotary drum and a double seal, including a seal unit engaging each annular flange, each sealing unit including:

a wearable sealing ring seated on said annular sealing flange of said rotary drum, said wearable sealing ring being formed of individual sections, each individual section of said sealing ring being provided with a circumferential groove, with a hole connected to said circumferential groove, and a sleeve connected to said hole, said sleeve being closed on one side and having a sealing medium connection on another side;

a sealing element front flange and a sealing element rear flange, said sealing ring being arranged displaceably between said sealing element front flange and said sealing element rear flange;

a deformable, pneumatic sealing element with a pressurized medium, said pneumatic sealing element being arranged above said sealing ring between said front flange and said rear flange; and a closing flange arranged between said sealing element front flange and said sealing element rear flange above said pneumatic sealing element.

10. A device according to claim 9, further comprising a mounting flange connected to a wall of an associated stationary chamber, said mounting flange being detachably connected to said rear flange.

11. A sealing medium seal device for sealing rotary drums of a drum-type furnace unit, the unit including a stationary chamber surrounding one end of the drum for charging in a charge and a chamber surrounding another end of the drum for receiving the discharge, the flue gases and residues, the sealing medium seal device comprising an annular axially extending sealing flange extending about each end of the rotary drum and a double seal, including a seal unit engaging each annular flange, each sealing unit including:

a mounting flange detachably connected to a wall of an associated stationary chamber;

a sealing element rear flange detachably connected to said mounting flange;

a front flange spaced a distance from said rear flange;

a closing flange connecting said front flange and said rear flange to define an annular space between said annular sealing flange, said front flange, said rear flange and said closing flange;

a wearable sealing ring seated on an associated annular sealing flange of said rotary drum, said wearable sealing ring being formed of individual sections, each individual section of said sealing ring being provided with a circumferential groove, with a hole connected to said circumferential groove, and a sleeve connected to said hole, said sleeve being closed on one side and having a sealing medium connection on another side; and a deformable, pneumatic sealing element with a pressurized medium, said pneumatic sealing element being arranged above said sealing ring between said front flange and said rear flange.

12. A device according to claim 11, further comprising:

a sealing medium line connected to said sealing medium connection for each individual section of said sealing ring, said sealing medium line being connected to a circular pipe for resupply of a sealing medium.

13. A device according to claim 11, wherein:

ends of said individual sections of said sealing ring are designed with a stepped pattern in an axial direction of said sealing ring providing gaps between ends of said individual sections.

14. A device according to claim 11, wherein:

ends of said individual sections of said sealing ring are designed with a stepped pattern in an axial direction of said sealing ring providing gaps between ends of said individual sections.

15. A device according to claim 11, wherein:

said sealing element front flange includes a vertically arranged elongated hole for said sealing medium connection introducing said sealing medium line for a sleeve of an individual section of said sealing ring.

16. A device according to claim 11, wherein:

said closing flange is nondetachably connected to said rear flange and said rear flange is detachably connected to said mounting flange.

17. A device according to claim 11, further comprising webs connecting said mounting flange to said stationary structure.

* * * * *